US012793017B1

(12) United States Patent
Balaubramanian

(10) Patent No.: US 12,793,017 B1
(45) Date of Patent: Nov. 10, 2026

(54) SYSTEMS AND METHODS TO GENERATE EMBEDDINGS OF USER COMPETENCY INFORMATION AND/OR IMPLEMENT VIRTUAL AGENTS REPRESENTING USERS OF A COLLABORATION ENVIRONMENT

(71) Applicant: Asana, Inc., San Francisco, CA (US)

(72) Inventor: Siddhartha Balaubramanian, Vancouver (CA)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 18/949,562

(22) Filed: Nov. 15, 2024

(51) Int. Cl.
*G06Q 10/10* (2023.01)
*G06Q 10/0631* (2023.01)

(52) U.S. Cl.
CPC ... *G06Q 10/103* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 12,568,019 | B2 * | 3/2026 | Sun | H04L 41/0886 |
| 2023/0162155 | A1 * | 5/2023 | Pelz | G06Q 10/101 705/300 |
| 2024/0202225 | A1 * | 6/2024 | Siebel | G06F 16/3326 |
| 2025/0021474 | A1 * | 1/2025 | Madan | G06F 40/20 |
| 2025/0131187 | A1 | 4/2025 | Cuomo | |
| 2025/0272062 | A1 | 8/2025 | Jeffrey | |
| 2025/0272639 | A1 | 8/2025 | Allen | |
| 2025/0307041 | A1 | 10/2025 | Anand | |
| 2026/0099419 | A1 | 4/2026 | Yuksel | |
| 2026/0105438 | A1 | 4/2026 | Cella | |

OTHER PUBLICATIONS

Tam TYC, Sivarajkuman S, Kapoor S, Stolyar AV, Polanska K, McCarthy KR, Osterhoudt H, Wu X, Visweswaran S, Ful S, Mathur P, Cacciamani GE, Sun C, Peng Y, Wang Y. A framework for human evaluation of large language models in healthcare derived from literature review. NPJ Digit Med. 2024 (Year: 2024).

* cited by examiner

*Primary Examiner* — Allan J Woodworth, II
(74) *Attorney, Agent, or Firm* — Esplin & Associates, PC

(57) ABSTRACT

Systems and methods to implement generate embeddings of user competency information derived from user interactions with a collaboration environment, and/or implement virtual agents representing users of a collaboration environment, are described herein. Exemplary implementations may: manage environment state information maintaining a collaboration environment; obtain user competency information characterizing user competencies; generate an embeddings datastore based on the user competency information; store the embeddings datastore in non-transitory electronic storage; provide a large language model with access to the embeddings datastore; and/or perform other operations. Exemplary implementations may: manage an embeddings datastore comprising a vector space representation of user competency information; obtain virtual agent definitions of virtual agents representing users; manage environment state information maintaining the collaboration environment; obtain agent-level prompts to execute actions within the collaboration environment; manifest the virtual agents to execute the agent-level prompts; update the environment state information; and/or perform other operations.

10 Claims, 5 Drawing Sheets

SYSTEMS AND METHODS TO GENERATE EMBEDDINGS OF USER COMPETENCY INFORMATION AND/OR IMPLEMENT VIRTUAL AGENTS REPRESENTING USERS OF A COLLABORATION ENVIRONMENT

FIELD OF THE DISCLOSURE

The present disclosure relates to the integration of one or more machine-learning models, such as a large language model and/or other trained machine-learning model, into collaborative online platforms such as an online collaboration environment.

BACKGROUND

Web-based collaboration environments, sometimes referred to as work management platforms, may enable users to assign projects, tasks, and/or other work assignments to assignees (e.g., other users) to complete. A collaboration environment may comprise an online environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. A way that operators look to improve the operation of the collaboration environment is through implementation of sophisticated computer-based models, such as machine learning and large language models. Improvements may be directed to automations that execute actions within the collaboration environment.

Some automation within collaborative online platforms may be performed deterministically. By way of non-limiting illustration, users and/or administrators of the platforms may define rules with trigger-actions combinations, where automated actions may be carried out in response occurrence of trigger events. These automations may follow deterministic approaches, e.g., IF trigger occurs THEN perform an action. These approaches, although providing improvements to the efficacy of the online platforms, may lack sophisticated decision-making and/or an ability to carry out actions in a way that emulates users.

To address these and/or other problems, one or more implementations presented herein propose techniques to generate embeddings of user competency information derived from user interactions with a collaboration environment to support execution of one or more models (e.g., a large language model), and/or implement virtual agents representing users of a collaboration environment that leverages the embeddings and/or other information resources.

One or more implementations may leverage computer-based models including, but not limited to, large language model(s) (LLMs). Large language model(s) may be particularly well suited to the features and/or functionality of the present disclosure, as the content of the records that make up the collaboration environment may already be defined in natural language prose following known grammatical structures. Accordingly, LLMs may be integrated into existing processes underlying a collaboration environment without negatively impacting user expectations of the collaboration environment. In some implementations, a user interface of the collaboration environment may continue to utilize user interface elements and/or pages that are familiar to users, while integrating model(s) and their functionality to advance effectiveness of the collaboration environment.

These, along with other features and/or functionality presented herein, may be recognized by persons of ordinary skill in the art as providing improvements upon the operation of a collaboration environment including, among others, increased efficiency and accuracy in the creation and management of work records, improvements in the user interfaces, and/or the manner in which model(s) are executed to carry out automated actions within the collaboration environment. Further, persons of ordinary skill in the art will recognize that feature(s) and/or functionality described herein is necessarily rooted in computer technology at least because of the specific integration of model(s) described herein, and/or because the collaboration environment itself is necessarily rooted in modern Internet technologies and web-based platforms.

One or more implementations of the disclosure describe a system configured to generate embeddings of user competency information derived from user interactions with a collaboration environment to execute a large language model and/or other models. One or more implementations of the disclosure describe a system configured to implement virtual agents representing users of a collaboration environment. The system(s) may include one or more of non-transitory electronic storage, one or more hardware processors (also referred to herein as "physical" processors) configured by machine-readable instructions, and/or other components. Executing the machine-readable instructions may cause the one or more hardware processors to facilitate generating embeddings of user competency information, and/or implementing virtual agents representing users of a collaboration environment that leverages the embeddings.

The machine-readable instructions may include one or more computer program components. The one or more computer program components may include one or more of an environment state component, a user component, a model component, an agent component, and/or other components.

The environment state component may be configured to manage environment state information maintaining a collaboration environment. The collaboration environment may be configured to facilitate interaction by users with the collaboration environment and/or each other. The users may interact with the collaboration environment and/or each other through instances of a graphical user interface. The environment state information may include work unit records and/or other records. The work unit records may describe units of work managed, created, and/or assigned within the collaboration environment.

The user component may be configured to obtain one or more of user competency information, user interaction information, and/or other information. The user interaction information may characterize interaction by the users with the collaboration environment. The user competency information may characterize user competencies derived from the interaction by users with the collaboration environment. The user competency information may characterize user competencies based on one or more of skills, knowledge, interest, responsibilities, opinions, preferences, goals, and/or other user attributes. By way of non-limiting illustration, first user interaction information for a first user may characterize a first set of user interactions by the first user with the collaboration environment. First user competency information for the first user may be generated from the first user interaction information. The first user competency information may characterize a first set of competencies of the first user derived from the first set of user interactions by the first user with the collaboration environment.

The model component may be configured to generate one or more embeddings datastores based on user competency information and/or other information. An embeddings datastore may include a vector space representation of user competency information and/or other information. A vector space representation may comprise vectors representing information units of the user competency information. By way of non-limiting illustration, an embeddings datastore may include a vector space representation of the first competency information.

The model component may be configured to provide one or more models with access to one or more embeddings datastores, so that the one or more models may utilize the one or more embeddings datastores as resource(s) for the model(s). By way of non-limiting illustration, a large language model may be configured to utilize an embeddings datastore to augment one or more prompts based on vector space representation of user competency information, and/or perform other operations in accordance with a Retrieval-Augmented Generation ("RAG") process and/or other processes.

In some implementations, providing one or more models with access to one or more embeddings datastores and/or other resources may be part of an agentic artificial intelligence (AI) framework. An agentic AI framework may generally refer to a system of artificial intelligence (AI) agents (also referred to herein as "virtual agents") that may act autonomously and/or make decisions without direct human intervention.

Non-transitory electronic storage may be configured to virtual agent definitions of virtual agents representing the users. Individual virtual agents may represent individual users and/or individual groups of users. The virtual agent definitions may identify lists of resources available to the virtual agents. The virtual agent definitions may include instructions dictating how resource(s) are utilized to manifest the virtual agents. Individual virtual agents may represent individual users by virtue of having access to a virtual space representation of information units of user competency information for the individual users. This effectively allows individual virtual agents to emulate the individual users.

By way of non-limiting illustration, the virtual agent definitions may include a first virtual agent definition of a first virtual agent representing the first user. The first virtual agent definition may include one or more of an identification of a first list of resources, first instructions which dictate how resources in the first list of resources are utilized to manifest the first virtual agent, and/or other information The agent component may be configured to obtain agent-level prompts to execute actions within the collaboration environment. Individual ones of the agent-level prompts may be associated with individual ones of the virtual agents. By way of non-limiting illustration, the agent-level prompts may include a first agent-level prompt to execute a first set of actions within the collaboration environment. The first agent-level prompt being associated with the first virtual agent.

The agent component may be configured to manifest the virtual agents to execute the agent-level prompts, and/or perform other actions. Manifesting individual virtual agents may include executing series of operations. By way of non-limiting illustration, manifesting virtual agents to execute agent-level prompts may comprise one or more of querying an embeddings datastore and/or other resources for relevant information units relevant to the agent-level prompts, augmenting execution of the agent-level prompts with the relevant information units, generating responses comprising action instructions for executing the actions in the collaboration environment, executing the actions in accordance with the action instructions, and/or other operations.

By way of non-limiting illustration, the first virtual agent may be manifested to execute the first agent-level prompt by one or more of querying an embeddings datastore for a first set of relevant information units relevant to the first agent-level prompt, augmenting execution of the first agent-level prompt with the first set of relevant information units, generating first action instructions for executing the first set of actions in the collaboration environment, executing the first set of actions in accordance with the first action instructions, and/or other operations.

The environment state component may be configured to update the environment state information in response to execution of agent-level prompts.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
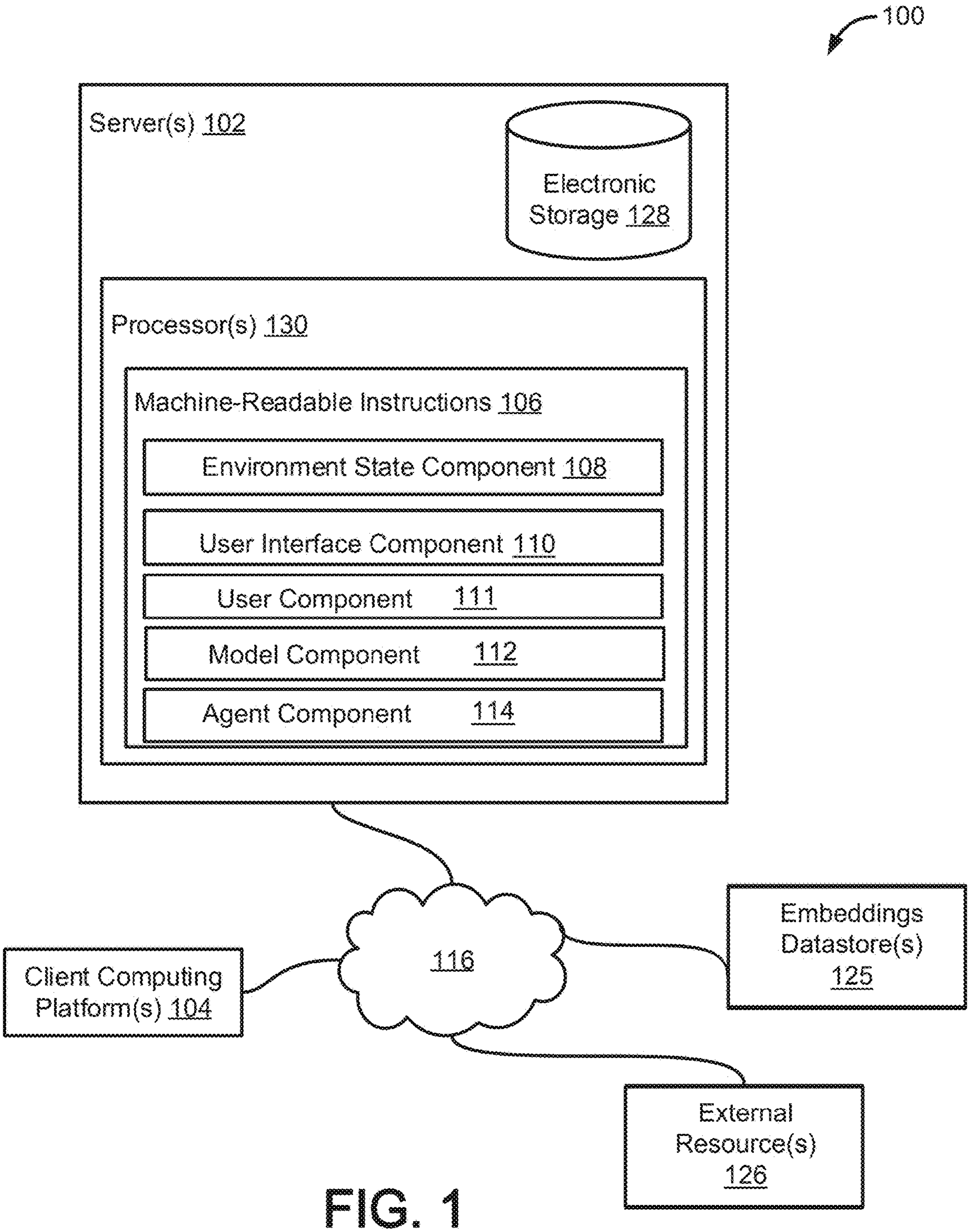
FIG. 1 illustrates a system configured to generate embeddings of user competency information and/or implement virtual agents representing users of a collaboration environment, in accordance with one or more implementations.

FIG. 1 illustrates a system 100 configured to generate embeddings of user competency information and/or implement virtual agents representing users of a collaboration environment, in accordance with one or more implementations. An agentic AI framework of machine learning may leverage embeddings of user competency information, so that virtual agents may be manifested to perform actions autonomously and/or make decisions without direct human intervention.

In some implementations, system 100 may include one or more of server(s) 102, client computing platform(s) 104, embeddings datastore(s) 125, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

External resource(s) 126 may include sources of information outside of system 100, external entities participating with system 100, and/or other resources. In some implementations, some or all of the functionality attributed herein to external resource(s) 126 may be provided by resource(s) included in system 100. In some implementations, an external resource may include entity (e.g., remote server, cloud service, etc.) hosting one or more models. In some implementations, external resource(s) 126 may represent a distributed networks of models, described in more detail herein.

Embeddings datastore(s) 125 may store embeddings and/or other information. Embeddings may refer to numerical representations of information units, typically in a high-dimensional vector space, that capture semantic relationships between information units. Embeddings may represent a transformation of complex inputs, like words, images and/or other information, into dense vectors, making it easier for models to understand and process such information. For instance, word embeddings may map similar words to nearby points in a vector space, allowing models to recognize relationships and contexts more effectively. Embeddings datastore(s) 125 may be optimized for storing, retrieving, and/or querying high-dimensional vectors efficiently. Embeddings datastore(s) 125 may comprise NoSQL database(s) and/or other databases specifically designed to handle high-dimensional vectors.

Server(s) 102 may include one or more of non-transitory electronic storage 128, one or more processors 130 configured by machine-readable instructions 106, and/or other components. The non-transitory electronic storage 128 may store one or more of record(s), virtual agent definition(s), user competency information, user interaction information, and/or other information. Machine-readable instructions 106 may include one or more instruction components. The instruction components may include computer program components. Executing the machine-readable instructions 106 may cause server(s) 102 to facilitate implementing one or more models to generate electronic work unit records of an online collaboration environment. The computer program components may include one or more of an environment state component 108, a user interface component 110, a user component 111, a model component 112, an agent component 114, and/or other components.

Environment state component 108 may be configured to manage environment state information and/or other information used in maintaining a collaboration environment (e.g., information stored in storage 128 and/or other storage locations). The collaboration environment may be configured to facilitate interaction by users with the collaboration environment. The environment state information may include one or more records. Records may include one or more of user records, work unit records, and/or other records. The user records may include user information describing users of the collaboration environment. The work unit records may include work unit information describing units of work assigned, created, and/or managed within the collaboration environment.

The user information in the user records may include values of user parameters and/or other information. The values of the user parameters may be organized in the user records corresponding to users interacting with and/or viewing the collaboration environment. The values of the user parameters may include information describing and/or identifying the users, their activity within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (e.g., units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, virtual agent definition of a virtual agent representing a user, and/or other information.

Schedule information for individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of and/or collaborate with one or more other users on.

Collaboration between users may include performing shared and/or cooperative activity within the collaboration environment to complete and/or advance one or more units of work. The shared and/or cooperative activity may include one or more of communication activity, work completion activity, and/or other user activity. One or more implementations of the present disclosure may be configured to leverage the fact that users may be interacting with the collaboration environment and/or each other in synchronous and/or asynchronous ways using remotely located client computing platforms. For example, a user may log into the collaboration environment and perform one or more actions and then sign out. The user may log in at a later date and notice that the collaboration environment has changed due to changes that were made by one or more other users while they were signed out. Accordingly, collaboration between users may have been occurring without any direct knowledge of other user's activity within the collaboration environment. At least some of the collaboration between users may be non-intuitive and/or not immediately knowable. Instead, one or more implementations described herein may take advantage of the existence of the work unit records that are stored and maintained by server(s) 102 which store and track user activity. From these records, collaboration may then be derived and/or determined in ways that would otherwise not be possible by the users individually and/or together.

Communication activity may include communicating within and/or outside the collaboration environment about a unit of work in an effort to advance progress toward completion of the unit of work and/or other units of work associated with the unit of work. Communicating within the collaboration environment may include one or more of adding comments to a comment thread, messaging via chat interfaces of the collaboration environment, adding comments as metadata to digital content items that are associated with a unit of work, "@" mentioning one or more users, and/or other activity. Communicating outside the collaboration environment may include one or more of communication through e-mail, generating calendar items that relate to completion of a unit of work, conducting meetings (in person and/or virtual), messaging via chat interfaces that are external to the collaboration environment, and/or other activity.

Work completion activity may include actions performed within the collaboration environment that are related to advancing progress of one or more work unit records for one or more units of work. The activity may include one or more of creating work unit records, assigning work unit records, marking units of work as complete, adding due dates to units of work, and/or other activity.

The "members" of the work unit records may include specifically named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are actively performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, portfolios, and/or other units of work.

Work unit records may be created by a given user for the given user and/or created by the given user and assigned to one or more other users. Work unit records may be created by a given user for the given user and/or created by the given user and managed by one or more other users. Tasks may include to-do items and/or action items one or more users should accomplish and/or plan to accomplish in order to complete a task. Individual work unit records may include and/or may be associated with one or more digital content items. An individual work unit records may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, work unit records created by, assigned to, and/or completed by the users may refer to a linking of the work unit records with the individual users in the collaboration environment. A work unit record may be linked with a user in a manner that defines one or more relationships between the user and the underlying unit of work. Such a relationship may connote and/or be a result of an activity (past, present, and/or future) by the user with respect to the work unit record. Such activity may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other activity.

Individual sets of work unit records may be defined by individual record hierarchies. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the hierarchical information may specify that individual records are concurrently subordinate to more than one other record in more than one hierarchy. This may be referred to as "multi-homing" of a record. By way of non-limiting illustration, a record may be subordinate to two other records within two different hierarchies. Stated otherwise, the record may be considered "multi-homed" with respect to the two other records. In the case of multi-homing, presence of a multi-homed record in multiple other superior records may be established through separate instances of the same multi-homed record in each of the other superior records. The multi-homed record thus may be accessed through either of the pages of the superior records.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to work unit records may be determined based on one or more interactions by one or more users with a collaboration environment. In some implementations, one or more users may create and/or assign one or more work unit records to themselves and/or another user. In some implementations, a user may be assigned a work unit record, and the user may effectuate a reassignment of the work unit record.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports a project, portfolio, and/or objective. The values may specify one or more of a name/title of another work unit record (e.g., project, objective), a name/username of an owner of another work unit record, and/or other information.

In some implementations, managing the environment state information may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., different hierarchies, groupings, etc.), and the cells within the column may be populated with visual content item representing work unit records that are associated with the sections.

In some implementations, environment state component 108 may be configured to manage information defining work unit pages (sometimes referred to simply as "pages") corresponding to the individual work unit records. Individual work unit pages may provide access to individual work unit records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual work unit records.

Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

In some implementations, work unit records may define tasks. The work unit records defining tasks may be referred to as "task records." The work unit information that defines tasks may be referred to as "task information" and/or other information. Task information may include values of work unit parameters for tasks managed within the collaboration environment. The work unit parameters for tasks may be referred to as "task parameters." The work unit parameters comprising task parameters may be specific to tasks and/or may include one or more parameters not shared with projects, objectives, and/or other records. The task parameters may characterize one or more tasks created, assigned, and/or managed within the collaboration environment and/or via the collaboration environment, and/or the metadata associated with the one or more tasks.

In some implementations, work unit records may define projects. The work unit records defining projects may be referred to as "project records." The work unit information that defines projects may be referred to as project information and/or other information. Project information may include values of work unit parameters for projects managed within the collaboration environment. The work unit parameters for projects may be referred to as "project parameters." The work unit parameters comprising project parameters may be specific to projects and may include one or more parameters not shared with tasks, objectives, and/or other records. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. The work unit records defining objectives may be referred to as "objective records." The work unit information defining objectives may be referred to as "objective information." The objective information may include values of one or more work unit parameters that define the objectives. The values of the work unit parameters may be organized in records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminders, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objective and key result (OKR) goal-setting framework. Objectives may be specified on one or more of a team basis, organization basis, and/or other specifications. In some implementations, objectives may be characterized as user objectives. User objectives may be specified on an individual user basis. A user objective may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, work unit records may define portfolios. The work unit records defining portfolios may be referred to as "portfolio records." The work unit information that defines portfolios may be referred to as portfolio information and/or other information. Portfolio information may include values of work unit parameters for portfolios managed within the collaboration environment. The work unit parameters for portfolios may be referred to as "portfolio parameters." The work unit parameters comprising portfolio parameters may be specific to portfolios and may include one or more parameters not shared with tasks, objectives, project, and/or other records. The portfolio parameters may characterize one or more portfolios created, owned, assigned, and/or managed within the collaboration environment and/or via the collaboration environment, and/or the metadata associated with the one or more portfolios. Individual ones of the portfolios may be associated with individual ones of the records. A given portfolio may have one or more owners and/or one or more collaborators working on the given portfolio. The given portfolio may be associated with one or more other units of work assigned to one or more users under the given portfolio heading. In some implementations, portfolios may include one or more units of work that may directly facilitate progress toward fulfillment of the portfolios. Accordingly, completion of units of work may directly contribute to progress toward fulfillment of the portfolio.

The values of the portfolio parameters may, by way of non-limiting example, include and/or specify one or more of: information about one or more projects within a given portfolio (which may include values of project parameters defined by one or more project records), information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information, permissions information, state of a workspace for a given project within the given portfolio, metadata associated with the portfolios, custom fields (e.g., values created by users), and/or other information.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The user interface component 110 may be configured to effectuate presentation of instances of a user interface of the collaboration environment on client computing platform(s) 104 of the users. The user interface may provide one or more views of the collaboration environment and/or provide other features and/or functionality. The one or more views may include one or more pages of the collaboration environment and/or other content. In some implementations, an individual view of the collaboration environment may textually and/or graphically display information from one or more of a user record, a work unit record, and/or other information. By way of non-limiting illustration, a view may display one or more of a work unit page, a queue of units of work, and/or other information. The user interface may include one or more user interface elements configured to facilitate user interaction with the user interface. By way of non-limiting illustration, user interface elements may include one or more of text input fields, drop-down menus, check boxes, display windows, virtual buttons, icons, graphics, panes, and/or other elements configured to facilitate user interaction.

Effectuating presentation of a user interface may include one or more of generating user interface information defining the user interface, communicating the user interface information to client computing platform(s) 104 over network(s) 116, and/or other operations. Individual client computing platform(s) 104 may receive the user interface information. The user interface information may cause the client computing platform(s) 104 to present instances of the user interface.

In some implementations, instances of the user interface may be configured to receive user input into the instances of the user interface at the client computing platform(s) 104. The user input may include one or more of selection of individual user interface elements, text entry, and/or other input.

In some implementations, user interface component 110 may be configured to effectuate presentation of instances of a user interface of the collaboration environment through which the users generate and/or submit prompts for one or more models. The user interface may include one or more user interface elements through which users may input text, select check boxes, and/or perform other interactions as part of submitting prompts. By way of non-limiting illustration, the user interface may include a selectable user interface element (e.g., virtual button) through which a user initiates a generation of a prompt. Individual user interface elements may be associated with individual commands to execute action(s) that form the basis of individual prompts. In some implementations, individual user interface elements may be displayed with indicia indicating the individual commands for which they are associated. By way of non-limiting illustration, a user interface element associated with a prompt for executing a work completion task may include indicia stating that the user interface element will manifest a virtual agent to assist in work completion (e.g., "click here for AI assistant to complete task"). By way of non-limiting illustration, a user interface element associated with a prompt for generating a description for a project may include indicia stating that the user interface element will manifest a virtual agent to assist in generating a description (e.g., "click here for AI assistant to generate description").

In some implementations, upon selection of the selectable user interface element, the user interface may present one or more of a pop-up window, page(s), a pane, and/or other user interface elements through which additional user input may be provided (e.g., additional text entry to define, refine and/or confirm a prompt).

In some implementations, instances of a user interface of the collaboration environment through which users generate and/or submit prompts for one or more models may include one or more text input boxes through which users manually define prompts. In some implementations, a text input box may be a standalone user interface element within a page of the user interface. In some implementations, a text input box may be part of a conversation tool through which users interact with one or more models (e.g., AI chatbot).

The user interface component 110 may be configured to obtain and/or generate user input information conveying user input within the instances of the user interface at the client computing platform(s) 104. The user input information may be stored in non-transitory electronic storage 128 and/or other storage locations. In some implementations, interactions at the client computing platforms 104 comprising user input may be communicated to user interface component 110 such that user interface component 110 may generate the user input information. In some implementations, individual client computing platforms may generate the user input information based on the user entry and/or selection at the client computing platform(s) 104 and communicate the user input information to the user interface component 110.

The user interface component 110 may be configured to, responsive to obtaining user input information, cause the instances of the user interface to navigate to pages and/or views, and/or perform other actions. In some implementations, navigating to work unit pages may include one or more of presenting a new user interface, displaying a user interface portion, presenting a pop-up window, and/or other navigation that leads to presentation of the work unit pages. In some implementations, responsive to obtaining user input information, one or more virtual agents may be manifested (see, e.g., model component 112 and/or agent component 114).

The model component 112 may be configured to implement one or more models. In some implementations, a model may comprise one or more of a machine learning model, a probabilistic model, a decision tree model, and/or other models. In some implementations, different models may be utilized at different stages of the system 100.

In some implementations, a model may utilize one or more of an artificial neural network, naïve Bayes classifier algorithm, k-means clustering algorithm, support vector machine algorithm, linear regression, logistic regression, decision tree-based model, random forest, nearest neighbors, matrix factorization (e.g., a class of a class of collaborative filtering algorithms), a classifier, a histogram, Retrieval-Augmented Generation (RAG), natural language processing, and/or other approaches. Training a model may utilize one or more of deep learning, supervised learning, semi-supervised learning, unsupervised learning, reinforcement learning, low-code techniques, and/or other techniques.

In supervised learning, a model may be provided with a known training dataset that includes desired inputs and outputs, and the model may be configured to find a method to determine how to arrive at those outputs based on the inputs. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labelled and unlabeled training information. Labelled data may comprise information that has meaningful tags so that the model can understand the information, while unlabeled information may lack those specific tags. By using this combination, the machine learning model may learn to label unlabeled data.

For unsupervised learning, a model may study training information (e.g., sample requests and corresponding new records) to identify patterns. There may be no answer key or human operator to provide instruction. Instead, the model may determine the correlations and relationships by analyzing training information. In an unsupervised learning process, the model may be left to interpret large information sets and address the training information accordingly. The model may try to organize training information in some way to describe its structure. This might mean grouping training information into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values (e.g., values of parameters of records). By defining the rules, the model then tries to explore different options and possibilities, monitoring and evaluating individual results to determine which one is optimal to generate correspondences. Reinforcement learning teaches the model trial and error. The model may learn from past experiences and adapt its approach in response to the situation to achieve the best possible result.

Machine learning models may operate by generating inferences, e.g., conclusions drawn about unseen or unmentioned information from learned knowledge. Generating inferences may refer to a process of making predictions, deductions, and/or conclusions based on patterns and/or relationships learned by a model. Inferences are a powerful aspect of machine learning, enabling models to reason, make connections, and/or provide insightful responses.

The process of generating inferences may involve using patterns and/or relationships learned from large amounts of information. Inference generating processes may rely on a model's ability to store information about concepts and/or relationships in its internal representations (e.g., knowledge encoding), identify similarities and/or connections between pieces of text, concepts, and/or entities (e.g., pattern recognition), apply learned patterns and/or relationships to new, unseen situations (e.g., generalize), and/or draw logical conclusions from encoded knowledge and/or recognized patterns (e.g., reason). In some implementations, inferences may be one or more of explicit, implicit, abductive, and/or deductive. Explicit inferences may be direct conclusions that may include specific pieces of information. Implicit inferences may be suggested and/or implied conclusions. Abductive inferences may be educated guesses or hypotheses based on incomplete information. Deductive inferences may be conclusions drawn with certainty, using logical rules and evidence.

In some implementations, a model may be trained on information derived from a domain of users. A model trained in this approach may otherwise be referred to as a "base" model from which individual user or group-specific models may be derived. Once a trained model (e.g., "base" model) has been derived from training information, individual user—and/or group-specific models may be derived. In some implementations, a certain amount of newly acquired information may be required in order to effectively retrain and/or otherwise adapt a base model to a specific user or group of users. In some implementations, adapting the base model may utilize incremental techniques, transfer learning, continual learning, batch-based techniques, and/or other techniques. Those skilled in the art may appreciate other techniques to adapt a base model to fit user- or group-specific information that are within the scope of the present disclosure. In some implementations, training information may be partitioned into per-domain datasets, and model component 112 may be configured to parallelize the model training such that a separate model may be produced and applied to each domain.

One or more of models used by system 100 may be continually refined as time goes on. By way of non-limiting illustration, values of parameters and associations of records with other records may be continuously updated as users interact with the collaboration environment, each other, virtual agents, and/or records, which is then input back into a model to further refine and/or retrain it. Other triggers to collect information for retraining may be considered.

In some implementations, a model may be continually refined for specific users and/or groups of users (e.g., teams, users of a given role, etc.). By way of non-limiting illustration, information on a specific user or group of users may be collected and fed back into a trained model to further refine it specifically for that user or group. This may be part of creating a continually learning user- or group-specific models.

In some implementations, a machine learning model may comprise a large language model (LLM) and/or other models. An LLM may refer to a type of artificial intelligence (AI) designed to process and/or understand human language. By way of non-limiting illustration, LLMs may comprehend meaning of words, phrases, and sentences, create new text based on what they have learned, and improve understanding and generation capabilities as more information and training is provided.

LLMs may be trained on text and/or other information and learn to represent language in a way that allows an LLM to generate text, answer questions, make predictions, follow instructions, write information to the collaboration environment, read information from the collaboration environment, and/or perform other activities. Prompts may serve as a starting point for LLM execution. Prompts may comprise input statements. Prompts may comprise one or more of natural language sentences or phrases, questions, descriptions of instructions, topics, keywords, and/or other information. The quality of a prompt may significantly influence a relevance and accuracy of a response. By providing a clear and specific prompt, LLM responses may be guided to meet needs and goals. Prompt engineering is a process of designing and/or optimizing input statements to achieve specific outcomes. Prompt engineering may be used to improve LLM performances of specific activities.

LLMs are flexible in that they may be fine-tuned for various activities, such as conversation, text summarization, language translation, and/or other activities. Fine tuning methods may adjust parameters of a model through additional training on a smaller, domain-specific set of information. Methods of fine-tuning may include one or more of supervised fine-tuning (SFT), instruction fine-tuning, full fine-tuning, parameter-efficient find-tuning (PEFT), and/or other types. Supervised Fine-tuning (SFT) may include updating to a pre-trained language model using labeled training information to perform a specific action. Instruction fine-tuning may train a model using examples that demonstrate how the model should respond to a query. Full fine-tuning may include updating one or more of a model's weights, resulting in a new version of the model. Parameter-efficient fine-tuning may include updating only a small set of parameters, reducing memory requirements and preventing catastrophic forgetting.

Fine-tuning a trained model process may include one or more of preparation, model selection, training, evaluation, and/or other operations. A preparation step may prepare a set of labeled training information examples in a specific format (e.g., CSV, JSON). The model selection step may choose a pre-trained model and select a fine-tuning method. The training step may train the pre-trained model on the prepared set of labeled training information examples, updating weights based on error between predictions and actual labels. An evaluation step may evaluate a model's performance on a validation set, and adjust parameters as needed.

In some implementations, LLMs may draw from one or more information sources to perform one or more operations. These information sources may include natural language sources (e.g., sources of text in prose), embeddings, and/or other information sources.

Embeddings datastore(s) 125 may store embeddings. An embedding may comprise a mathematical representation of a word, a character, and/or phrase as a vector in a high-dimensional space. A vector may denote semantic meaning and/or relationships of word, a character, and/or phrase allowing a model to perform operations. A collection of embeddings may be generated for a set of information units. The collection of embeddings may make up an embeddings database.

Embeddings may allow models to understand and process information more effectively. The process of embedding information may map data points to a vector space, where individual dimensions represent individual features and/or attributes. This space may allow for mathematical operations and comparisons between data points. Embeddings may form distributed representations, meaning that information may be spread across multiple dimensions, rather than being localized to a single dimension. Embeddings may denote semantic meaning of points in the vector space, like the relationships between words or images, by measuring similarity and distance between points, using metrics like cosine similarity or Euclidean distance. Embeddings may reduce the dimensionality of high-dimensional data, making it more tractable for models to process.

Embeddings, when used in conjunction with implementation of LLMs and/or other models, may enable the model(s) to process text as numerical inputs, capture subtle semantic relationships, facilitate generalization to unseen information, and/or perform other processes such as classification, clustering, and/or generation. The general process of generating embeddings may include one or more of collecting input information, tokenizing the input information, implementing an embedding generation technique, extracting embeddings, and/or other operations.

Tokenizing may include splitting text into individual tokens, e.g., text may be broken down into individual tokens, such as words, subwords, and/or characters. Each token may be represented as a vector in a high-dimensional space (e.g., 100-1000 dimensions). Individual vector values of individual vectors may represent an individual token's semantic features. The semantic features may include one or more of meaning, context, relationships with other tokens, syntactic roles, grammatical roles, and/or other features. In some implementations, use of a high-dimensional vector space may result in tokens with similar meanings or contexts being mapped to nearby points in the vector space, enabling a model to capture nuances in language. In some implementations, a model may be configured to learn to adjust embedding vectors during training to refine an understanding of the tokens and/or their relationships.

Implementing an embedding generation technique may include one or more of choosing an embedding generation technique and/or pre-trained model (e.g., model selection), training the model on prepared data, and/or other steps. Embedding generation techniques may include one or more of word embeddings (e.g., Word2Vec, GloVe) that may represent words as vectors, character embeddings that may represent individual characters as vectors, subword embeddings that may represent subwords (parts of words) as vectors, and/or other techniques. Pre-trained models may include one or more of Bidirectional Encoder Representations from Transformers (BERT), Robustly Optimized BERT Approach (ROBERTa), XLNet, and/or other embedding techniques.

In some implementations, a natural language processing (NLP) framework utilized by LLMs may include Retrieval-Augmented Generation ("RAG"). RAG combines the strengths of retrieval-based and generative models to generate more informative and accurate responses. RAG may be implemented in one or more steps and/or through one or more resources. A resource in this context may refer to a dedicated set of functionality known to perform one or more types of operations. A resource may have access to one or more models, and may include prompting known to be effective to carry out certain type(s) of operation(s) with certain model(s). The resources may include one or more of other models, tools, and/or processes. In some implementations, resources may be distributed across multiple different systems within a distributed network. In some implementations, resources may be part of an LLM. In RAG, resources may include one or more of a retrieval resource, an augmentation resource, a generation resource, and/or other resources.

In RAG, a retrieval resource may perform a retrieval step of searching for relevant information related to an input prompt and/or perform other operations. A generation resource may perform a generation step which uses retrieved information (which may be augmented by an augmentation resource performing an augmentation step by including the retrieved information as context) to generate a response and/or other operations. A RAG approach may result in improved accuracy of an LLM by leveraging knowledge contained in the retrieved information.

By way of non-limiting illustration, a retrieval resource may perform one or more of encoding an input prompt into a query vector, searching an information source for relevant information based on the query vector, retrieve relevant information, rank the retrieved information based on relevance to the input prompt, and/or other operations. Searching may be done using various techniques, including one or more of semantic search, keyword matching, embedding-based similarity search (e.g., based on embeddings described herein), and/or other techniques.

In some implementations, an augmentation resource may perform one or more of encoding top-ranked information into vectors (if not already in a vector space representation), combining the vectors with a query vector to create contextualized embeddings, and/or other operations. The contextualized embeddings may represent an augmentation of the input prompt, or, in other words, an augmented input prompt (when decoded back to natural language). "Combining" vectors with a query vector may include appending the top-ranked information (vectorized) to the query vector to create a concatenation, and/or other operations. In some implementations, combining may utilize one or more attention mechanisms that allow a model to weigh the importance of different embeddings when generating a response. The contextualized embedding may capture relationships between the input prompt and the retrieved, top-ranked, information. In LLMs, "context" may refer to information that is provided as additional input that helps a model to understand meaning and/or relevance of a given input, question, and/or prompt. Context may include one or more of previous conversations or interactions, specific topics or subjects, relevant details or facts, situational information (e.g., tone, intent, and/or nuances), and/or other information.

In some implementations, a generation resource may perform one or more of encoding the augmented input prompt into a vector (and/or obtaining the contextualized embeddings), generating a response based on the encoded augmented input prompt (e.g., the contextualized embeddings), and/or other operations. Generating the response may be based on one or more of language modeling, sequence-to-sequence generation, text summarization, and/or other techniques. In some implementations, other operations may include post-processing, such as one or more of decoding, spell checking, grammar correction, and/or other processing.

RAG may offer several advantages over traditional retrieval-based and/or generative models. Such advantages may include one or more of improved accuracy, fluency, coherence, and/or flexibility. By way of non-limiting illustration, RAG may be applied to various NLP operations and domains, making it a versatile and powerful approach.

In some implementations, models implementing RAG may be trained using a combination of supervised and/or unsupervised learning objectives. By way of non-limiting illustration, a model may be trained on labeled datasets to learn the relationships between input prompts, retrieved documents, and/or other information generated responses. By way of non-limiting illustration, a model may be trained on large datasets to learn the patterns and structures of language.

In some implementations, model component 112 may be configured to store a model in the non-transitory electronic storage 128 and/or other storage locations. In some implementations, one or more models may be hosted by external resource(s) 126.

In some implementations, model component 112 may be configured to access one or more models through a distributed network of models. Accessing a model may refer to a process of interacting with a model and/or utilizing a model's capabilities remotely through a network connection. There are several ways to access model(s) in a distributed network, including one or more of API calls (e.g., send requests to a server hosting a model, and receive responses through APIs), Remote Procedure Calls (RPC) (e.g., invoking model methods or functions remotely, as if the model were a local application), Message Passing (e.g., send messages to a server hosting a model, and receive responses through message queues or brokers), and/or other methods for providing prompts, receiving inferences, and/or otherwise communicating with one or more models.

Distributed networks of models may refer to a design where multiple models are trained and/or deployed across a network of devices, or "nodes," working together to achieve a common goal. Distributed networks provide many advantages. These include, among other, scalability to handle larger datasets and more complex models by distributing the computational workload, flexibility by allowing for the integration of different models and architectures, ability to continue functioning even if some nodes fail, leveraging diverse sets of information and models to enhance overall performance and/or generalization, reducing the risk of a single point of failure, and/or speeding up training times by parallelizing computations across nodes. Some examples of distributed networks include PyTorch Distributed, TensorFlow Distributed, Apache MXNet, and Hugging Face Transformers.

With respect to training, a distributed network may split training information across multiple nodes, where each node may train a replica of a given model. Nodes may train locally and share model updates with a central server. In some implementations, a model may be split across multiple nodes, and each node may train a portion of the model. In some implementations, nodes may share relevant information, reducing communication overhead.

When generating interferences, input may be split across multiple nodes, and individual nodes may generate inferences on its portion. In some implementations, a model may be split into stages across nodes, and individual nodes may individually perform one or more stages in the process of generating an inference. By way of non-limiting illustration, a retrieval step may be performed at one node, an augmentation step may be performed at another node, and a generation step may be performed at yet another node.

In some implementations, a distributed network may implement one or more resources, one or more AI agents, and/or other features and/or functionality. The resources may be configured to access one or more models across one or more nodes and/or other entities participating in the network. The resources may be configured to access one or more databases of information (e.g., embeddings database(s), etc.) and/or other entities participating in the network. As described herein, a resource may refer to a dedicated set of functionality known to perform one or more types of operations. A resource may have access to model(s), and may execute prompting known to be effective to carry out certain type(s) of operation(s) with certain model(s). The resources may include one or more of other models, tools, and/or processes.

An AI agent (also referred to herein as a "virtual agent") may include a set of software functionality configured to interact with other agents and/or resources to make decisions and/or achieve an outcome. In some implementations, a set of AI agents may orchestrate the utilization of resources, large language models, databases, and/or other entities in order to provide a response to a prompt. By way of non-limiting illustration, resources and AI agents may be organized in one or more hierarchies. AI agent(s) may obtain prompts, identify and organize a set of activities to carry out to accomplish what is being prompted (e.g., to provide a response), and/or perform other functionally. The AI agent(s) may access model(s) directly in the execution of the set of activities, and/or through one or more resources organized in the hierarchy. By way of non-limiting illustration, an operation to be carried out by a given AI agent in response to obtaining a prompt may itself include the given AI agent prompting one or more other resources (e.g., other AI agent(s), resource(s), and/or large language model(s) directly) using prompts known by the given AI agent to be effective. Other resource(s) may then identify and organize a set of sub-operations known to the other resource(s) to be effective to accomplish what is being asked by the given AI agent.

User component 111 may be configured to generate embeddings based on one or more of user competency information, user interaction information, and/or other information. User component 111 obtain one or more of user competency information, user interaction information, and/or other information. The user competency information may characterize user competencies derived from interaction by users with the collaboration environment. The user competency information may characterize user competencies based on one or more of skills, knowledge, interests, responsibilities, opinions, preferences, goals, and/or other user attributes.

Skills may characterize one or more of hard skills, soft skills, and/or other characterizations. Hard skills may refer to technical abilities. The technical abilities may be work-specific (e.g., job specific). Soft skills may refer to one or more of communication, teamwork, problem-solving, and/or other characterizations.

Knowledge may characterize one or more of domain expertise, technical knowledge, continuous learning, problem-solving ability, interdisciplinary knowledge, communication of knowledge, and/or other characterizations. Domain expertise may refer to a user's in-depth understanding of their specific field or industry. Technical knowledge may include role- or work-specific knowledge. Continuous learning may refer to a behavior of updating competencies through training and/or self-directed study. Problem-solving ability is also crucial, as it reflects how well an employee can apply their knowledge to real-world challenges. Interdisciplinary knowledge may refer to an ability to draw from various fields. Communication of knowledge may refer to how well a user can share their knowledge with others.

Opinions may characterize one or more of values and beliefs, problem-solving approach, engagement and commitment, team dynamics, adaptability, cultural awareness, and/or other characterizations. Values and beliefs may reflect one or more of personal values, ethics, priorities, and/or other information. Problem-solving approach may reflect understanding of challenges and/or solutions, and may reveal analytical thinking and/or creativity. Engagement and commitment may reflect levels of engagement and/or investment in work and/or an organization as a whole. Team Dynamics may reflect how user interact with colleagues, including willingness to collaborate, compromise, lead discussions, and/or other characterizations. Adaptability may reflect how users react to differing opinions or changes in direction, which may indicate flexibility and openness to new ideas. Cultural Awareness may reflect perspectives on diversity, equity, and/or inclusion and/or show awareness and sensitivity thereof.

Preferences may characterize inclination for one or more options over others. By way of non-limiting illustration, preference may characterize one or more of work styles (such as collaborative versus independent work), communication methods, work types, and/or other characteristics.

Goals may characterize information supplied by users in objective records and/or other objectives that may be inferred from user activity. Goals may characterize one or more of aspirations, motivations, priorities, and/or other information.

Interests may characterize what a user may be passionate about or enjoys doing, both in and outside of work. Interests may be in one or more of professional development, collaboration, innovation, creativity, leadership, mentorship, work-life balance, and/or other considerations.

The user interaction information may characterize interaction by the users with the collaboration environment. Interaction by the users may be determined by monitoring change in environment state information. Interaction may include one or more of execution of one or more actions within the collaboration environment, occurrence of inaction, and/or other information. In some implementations, actions by users within the collaboration environment may include one or more of changing completion status of an individual work unit record, assigning an individual user to the individual work unit record, generating one or more work unit records, organizing the one or more work unit records, generating text within a page of the graphical user interface (e.g., adding comments, posting replies, generating text making up portions of a record, and/or other text generation), attached digital content items, executing a workflow, and/or other actions.

The user component 111 may be configured to generate user competency information. The user competency information may be generated based on user interaction information and/or other information. The user competency information may be generated based on implementation of one or more models. By way of non-limiting illustration, the user component 111 may be configured to determine, by a large language model and/or other models, user competency information from the user interaction information. By way of non-limiting illustration, one or more models may be prompted to evaluate environment state information to determine user competency information based on past user interactions. In some implementations, model(s) may be prompted to evaluate past user interactions over a specified time period. In some implementations, the specified time period explicit (e.g., from January 1 to June 30), and/or implicit (e.g., since inception of a user account, a past quarter, a past calendar year, since work started on a given unit of work, etc.).

In some implementations, user competency information may be derived from information stated by users. For example, users may be presented a questionnaire in which they submit answers forming the basis of user competency information.

By way of non-limiting illustration, the user interaction information may include first user interaction information for a first user. The first user interaction information may characterize a first set of user interactions by the first user with the collaboration environment. The user competency information may include first user competency information for the first user. The first user competency information for the first user may be generated from the first user interaction information and/or other information. The first user competency information may characterize a first set of competencies of the first user derived from the first set of user interactions by the first user with the collaboration environment.

The model component 112 may be configured to generate one or more embeddings datastores 125 based on user competency information and/or other information. An embeddings datastore may include a vector space representation of user competency information and/or other information. A vector space representation may comprise vectors representing information units of the user competency information. Individual information units of the user competency information may represent one or more of words, phrases, sentences, paragraphs, and/or other units. By way of non-limiting illustration, an embeddings datastore may include a vector space representation of the first competency information. An embedding datastore may be generated by one or more techniques described herein and/or apparent to a person having ordinary skill in the art. By way of non-limiting illustration, generating an embeddings datastore based on user competency information may include one or more of obtaining the user competency information, tokenizing the user competency information, implementing an embedding generation technique, extracting embeddings, storing the embeddings in embeddings datastore(s) 125, and/or other operations.

The model component 112 may be configured to obtain one or more prompts. Individual prompts may include individual commands to execute one or more actions in the collaboration environment. By way of non-limiting illustration, individual prompts may be related to one or more of generating new work unit records, assigning individual users to individual work unit records, assigning individual roles to the individual roles assigned to the individual work unit records, recommending collaboration on the individual work unit records, and/or other actions that a user may otherwise manually perform.

The prompts may be generated in response to explicit user input by users and/or automatically in response to one or more context triggers. By way of non-limiting illustration, users may generate prompts through input into a graphical user interface of the collaboration environment (see, e.g., user interface component 110).

In some implementations, automatic generation of prompts may be effectuated based on context triggers (e.g., trigger events) occurring in the collaboration environment. By way of non-limiting illustration, environment state component 108 may be configured to detect, based on monitoring the environment state information, occurrence of individual trigger events. The model component 112 may be configured to automatically generate individual prompts in response to detection of occurrence of individual trigger events. In some implementations, model component 112 may maintain trigger-prompt mapping information which identify which trigger events may lead to which prompts being generated. By way of non-limiting illustration, an occurrence of a work unit record being marked complete may form a context trigger for generating a prompt to execute one or more particular actions. By way of non-limiting illustration, an occurrence of a comment being added to a work unit page may form a context trigger for generating a prompt to execute one or more particular actions that use the content of the comment as context. In some implementations, users and/or system administrators may define trigger-prompt mapping information within automation records.

The model component 112 may be configured to provide one or more models with access to one or more embeddings datastores 125. The access may allow the one or more models to utilize the one or more embeddings datastores 125 as resource(s) for the model(s). By way of non-limiting illustration, a large language model may be configured to utilize an embeddings datastore to augment individual prompts based on vector space representation of user competency information, and/or perform other operations in accordance with a RAG process and/or other processes.

By way of non-limiting illustration of a RAG process of the present disclosure, the model component 112 may be configured to obtain individual prompts for one or more models, such as a large language model. The model component 112 may be configured to augment individual prompts based on relevant vector space representation(s) in an embeddings datastore to generate augmented prompts. In order to augment prompts, the model component 112 may be configured to perform one or more of encode individual prompts into individual query vectors, query an embeddings datastore for relevant vector space representation(s) based on individual query vectors, retrieve the relevant vector space representation(s), rank the relevant vector space representation(s) based on relevance to the individual prompts, combine top-ranked relevant vector space representation(s) with individual query vectors to create contextualized embeddings, and/or other operations. The contextualized embeddings may represent augmentations of the individual prompts, or, in other words, individual augmented prompts (e.g., when decoded back to natural language).

The model component 112 may be configured to generate, by one or more models, individual responses to individual prompts based on individual augmented prompts. The individual responses may include action instructions for executing action(s) in the collaboration environment. The model component 112 may be configured to execute action(s) in the collaboration environment in accordance with action instructions.

By way of non-limiting illustration, the prompts may include a first prompt to execute a first set of actions in the collaboration environment. The first prompt may be augmented based on a first set of relevant vector space representation(s) to generate a first augmented prompt (and/or a first contextualized embedding). A first response to the first prompt may be generated based on the first augmented prompt and/or other information. The first response may include first action instructions to execute the first set of actions, and/or other information.

In some implementations, providing one or more models with access to one or more embeddings datastores and/or other resources may be part of an agentic artificial intelligence (AI) framework. An agentic AI framework may generally refer to a system of artificial intelligence (AI) agents (also referred to herein as "virtual agents") that may act autonomously and/or make decisions without direct human intervention.

Non-transitory electronic storage 128 may be configured to store virtual agent definitions of virtual agents representing the users. Individual virtual agents may represent individual users and/or individual groups of users. The virtual agent definitions may include information identifying lists of resources available to the virtual agents and/or other information. The virtual agent definitions may include instructions dictating how resource(s) are utilized to manifest the virtual agents and/or other information. The resources available to individual virtual agents may include one or more of the embeddings datastore(s) 125, one or more models, one or more other virtual agents, one or more records, and/or other resources. Individual virtual agents may represent individual users by virtue of having access to a virtual space representation of information units of user competency information for the individual users. This effectively allows individual virtual agents to emulate the individual users.

In some implementations, individual lists of resources available to individual virtual agents may be specified by associated individual users. By way of non-limiting illustration, individual users may identify which record(s) may be made available as context for individual virtual agents. For example, a user may wish to limit virtual agent access to work unit records associated with a team of users the user belongs to, as opposed to all work across an organization. Accordingly, a list in an agent definition may list a subset of work unit records associated with work by the team of users.

By way of non-limiting illustration, the virtual agent definitions may include a first virtual agent definition of a first virtual agent representing the first user. The first virtual agent definition may include one or more of an identification of a first list of resources, first instructions which dictate how resources in the first list of resources are utilized to manifest the first virtual agent, and/or other information.

In some implementations, individual prompts including individual commands to execute one or more actions in the collaboration environment may be "agent-level" prompts. Individual ones of the agent-level prompts may be associated with individual ones of the virtual agents. The instructions in the virtual agent definitions dictating how resource(s) are utilized to manifest the virtual agents may include instructions to configure resource-level prompts for the resource(s). Resource-level prompts for the resource(s) may be configured in order to carry out one or more processes with respect to individual resources. The configuration and/or orchestration of the resource-level prompts for the resource(s) may be defined by the virtual agent definitions.

In response to obtaining agent-level prompts to execute actions within the collaboration environment, agent component 114 may be configured to identify which individual ones of the virtual agents are associated with individual ones of the agent-level prompts. In some implementations, prompt context may be used to inform identification of individual users, and therefore identification of associated virtual agents. Prompt context may refer to the trigger event and/or other mechanism through which a prompt was generated. Prompt context may be indicative of one or more users, so that individual virtual agents associated with individual users may be identified.

In some implementations, prompt context of a prompt may include explicit identification of a user. By way of non-limiting illustration, a prompt may be generated in response to a given user defining a prompt in a text box, so that the virtual agent associated with the given user may be identified. By way of non-limiting illustration, a prompt may be generated in response to comment identifying a given user, so that a virtual agent associated with the given user may be identified.

In some implementations, prompt context of a prompt may include an implicit identification of a user. By way of non-limiting illustration, a prompt may be generated in response to a work unit record being marked complete. The work unit record may be associated with a user having an "owner" role with respect to that work unit record, so that a virtual agent associated with the owner user may be identified. By way of non-limiting illustration, a prompt may be generated in response to a comment being added to a work unit page of a work unit record. The work unit record may be associated with a user having an "assignee" role with respect to that work unit record, so that a virtual agent associated with the assignee user may be identified.

By way of non-limiting illustration, the first prompt may include a first agent-level prompt to execute the first set of actions within the collaboration environment. The first agent-level prompt may be associated with the first virtual agent. In some implementations, the first agent-level prompt may be associated with the first virtual agent by virtue of the commands to execute the first set of actions invoking the first user.

The agent component 114 may be configured to manifest the virtual agents to execute the agent-level prompts, and/or perform other actions. Manifesting individual virtual agents may include executing series of operations. By way of non-limiting illustration, manifesting virtual agents to execute agent-level prompts may comprise one or more of querying an embeddings datastore and/or other resources for relevant information units relevant to the agent-level prompts, augmenting execution of the agent-level prompts with the relevant information units, generating responses comprising action instructions for executing the actions in the collaboration environment, executing the actions in accordance with the action instructions, and/or other operations.

In some implementations, executing agent-level prompts may be based on one or more of identifying the resource(s) to be utilized, configuring one or more resource-level prompts based on virtual agent definitions, executing individual resource-level prompts, and/or other operations. In some implementations, individual resource-level prompts associated with individual resources may include prompts known to execute one or more features and/or functionality with respect to the individual resources. By way of non-limiting illustration, individual resource-level prompts associated with individual resources may be related to one or more of querying, retrieval, analysis (e.g., analyzing similarities, dimensionality reduction, comparisons, etc.), clustering, generating new embeddings, updating, evaluating, specifying commands, providing data input, extracting features, evaluating model performance, tuning hyperparameters, facilitating cross-model communication, making conditional queries, integrating outputs, transforming data formats, creating feedback loops, generating training data, setting up experiments, conducting error analysis, adjusting model architectures, implementing data augmentation techniques, suggesting visualization methods, orchestrating multi-model operations, scheduling training runs, optimizing resource allocation, validating model assumptions, formulating hypotheses, conducting sensitivity analyses, summarizing findings, generating reports, advising on deployment strategies, analyzing user feedback for model improvement, recommending best practices, suggesting feature engineering techniques, designing user interfaces for model interaction, assessing model robustness, exploring interpretability methods, generating synthetic data, and/or other operations. Those skilled in the art may recognize what resource-level prompts may be utilized and/or how they may be configured to in order to execute the features and/or functionality herein.

By way of non-limiting illustration, the first virtual agent may be manifested to execute the first agent-level prompt. The first virtual agent may be manifested to execute the first agent-level prompt by one or more of querying an embeddings datastore for a first set of relevant information units relevant to the first agent-level prompt, augmenting execution of the first agent-level prompt with the first set of relevant information units, generating first action instructions for executing the first set of actions in the collaboration environment, executing the first set of actions in accordance with the first action instructions, and/or other operations.

In some implementations, executing the first agent-level prompt may be based on configuring one or more resource-level prompts. By way of non-limiting illustration, resource-level prompts configuration in the execution of the first agent-level prompt may include one or more of configuring a first resource-level prompt to the one or more models to perform the searching of the embeddings datastore for the first set of relevant information units relevant to the first agent-level prompt, configuring a second resource-level prompt to the one or more models to generate a first augmented prompt based on the first set of relevant information, configuring a third resource-level prompt to the one or more models to generate a first response to the first augmented prompt (e.g., with the first response including the first action instructions), configuring a fourth resource-level prompt to the one or more models to execute the first set of actions within the collaboration environment in accordance with the first action instructions, and/or configuring other resource-level prompts. In some implementations, executing the first agent-level prompt may include executing the resource-level prompts.

The environment state component 108 may be configured to update the environment state information in response to execution of the agent-level prompts. The updated environment state information may be reflected in updated views of the user interface of the collaboration environment.

Figure 3:
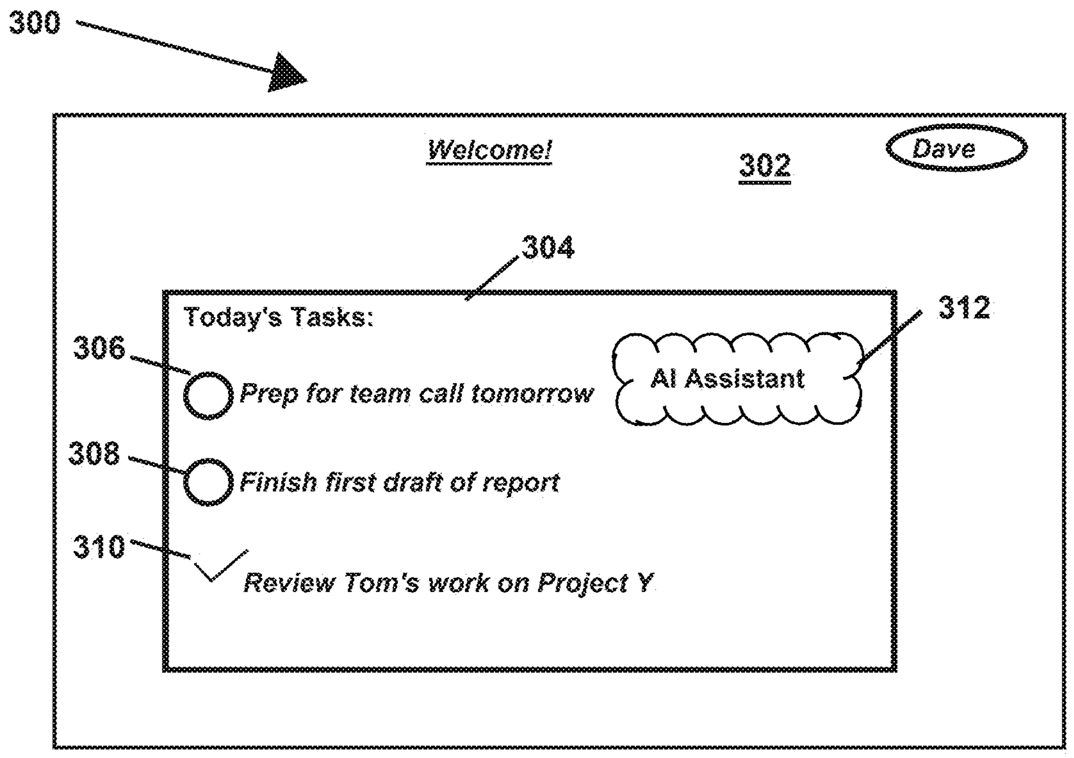
FIG. 3 illustrates a user interface, in accordance with one or more implementations.

FIG. 3 illustrates a user interface 300 of a collaboration environment, in accordance with one or more implementations. The user interface 300 may include a view 302 of a collaboration environment. In particular, the user interface 300 may display a queue 304 of items identifying one or more work unit records assigned to a user (e.g., "Dave"). The items in the queue 304 may include one or more of a first item 306 identifying a first work unit record (titled "Prep for team call tomorrow"), a second item 308 identifying a second work unit record (titled "Finish first draft of report"), a third item 310 identifying a third work unit record (titled "Review Tom's work on Project Y"), and/or other items. Individual items may include user interface elements representing completion status (e.g., an open circle for "not complete" and a check mark for "marked complete").

In accordance with one or more implementations of the present disclosure, the user interface 300 may include one or more options to invoke a virtual agent. By way of non-limiting illustration, the user interface 300 may include a user interface element 312 (e.g., virtual button) to generate one or more prompts. By way of non-limiting illustration, selection of the user interface element 312 may generate a prompt to execute an action for the first work unit record. The action may include, for example, generating a workflow to complete the task of "Prep for team call tomorrow." In some implementations, a virtual agent may be invoked without specific user instruction. By way of non-limiting illustration, one or more interactions with user interface 300 may define a context trigger which may initiate a manifestation of a virtual agent. By way of non-limiting illustration, an action of marking the third item 310 may comprise a context trigger to carry out one or more actions through manifestation of a virtual agent (see, e.g., FIG. 5).

Figure 4:
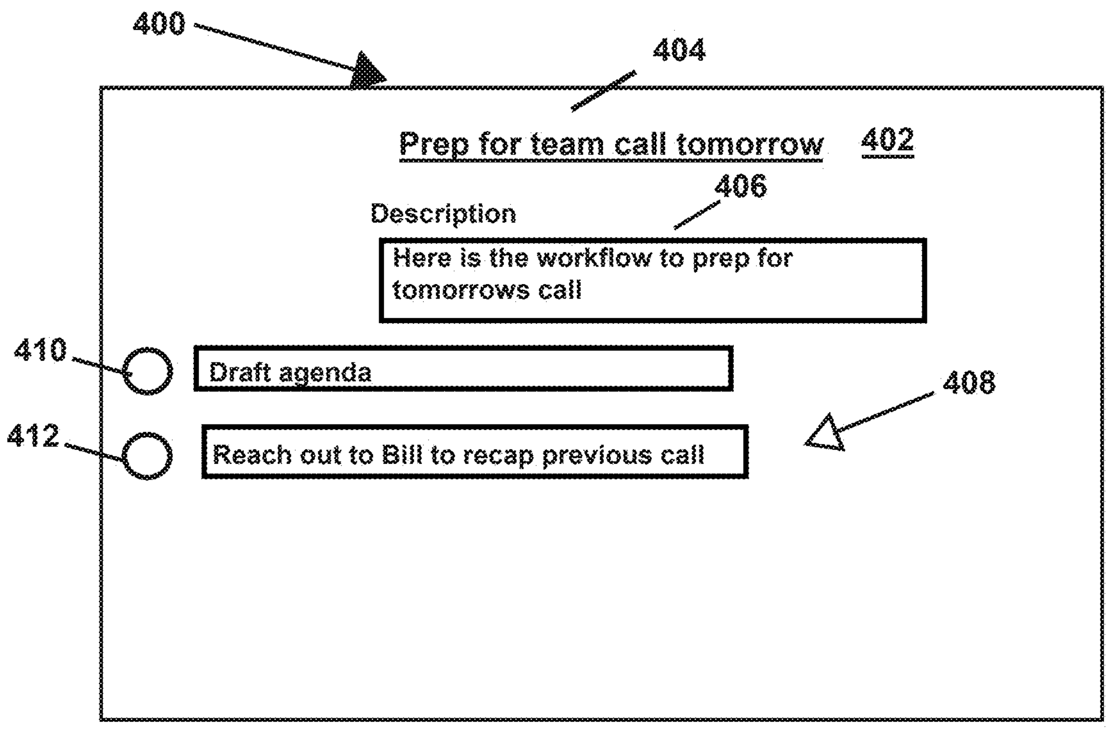
FIG. 4 illustrates a user interface, in accordance with one or more implementations

FIG. 4 illustrates a user interface 400 of a collaboration environment, in accordance with one or more implementations. The user interface 400 may include a view of a collaboration environment. In particular, the user interface 400 may include a work unit page 402 of the first work unit record. The user interface 400 may display values of one or more parameters for the first unit record, and/or other information. By way of non-limiting illustration, user interface 400 may include one or more of a user interface element 404 displaying a title of the first work unit record ("Prep for team call tomorrow"), a user interface element 406 displaying a description of the first work unit record, a user interface element 408 displaying a list of sub-work unit records for subunits of work (e.g., subtasks 410, 412) associated with the first work unit record, and/or other information. One or more values of one or more parameters of the first work unit record may reflect an outcome of manifesting a virtual agent to execute action instructions derived from a response to a prompt to generate a workflow to complete the task of "Prep for team call tomorrow. In this scenario, the workflow may be reflected by a generation of the sub-work unit records listed (410, 412), which may emulate how Dave gets organized to prepare for calls (e.g., following up with participants from previous calls, drafting formal agendas, etc.).

Figure 5:
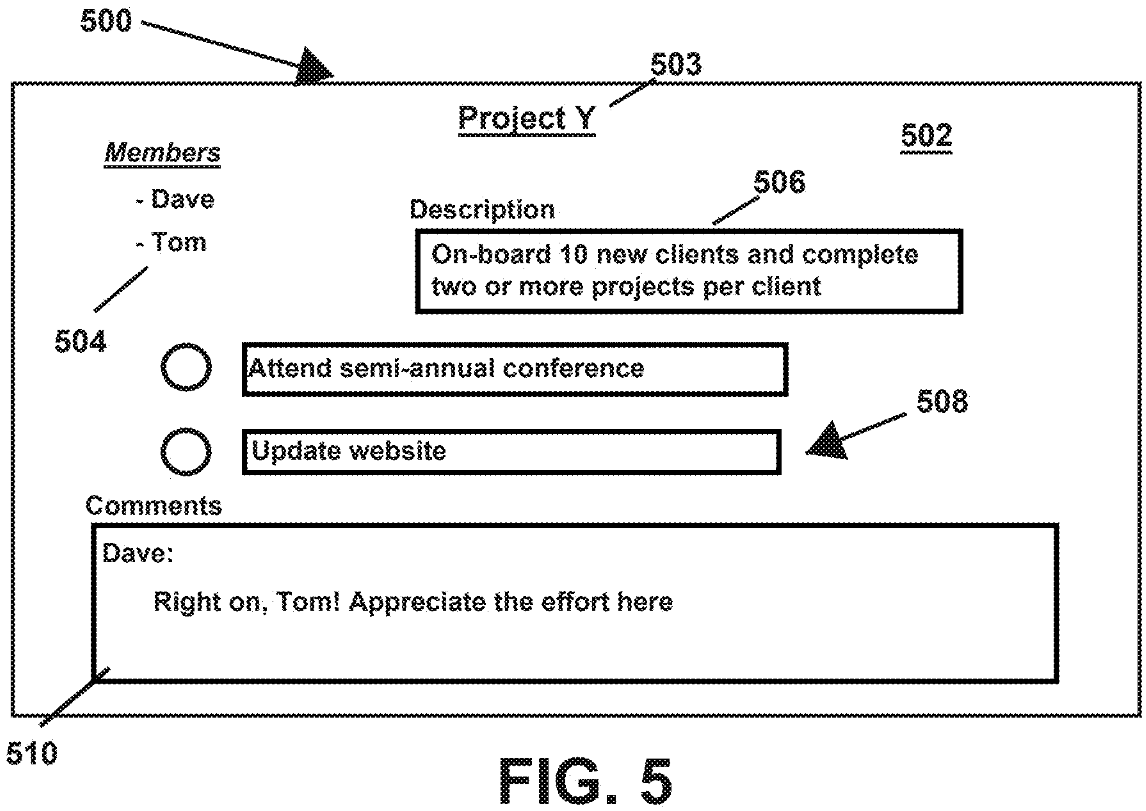
FIG. 5 illustrates a user interface, in accordance with one or more implementations.

FIG. 5 illustrates a user interface 500 of a collaboration environment, in accordance with one or more implementations. The user interface 500 may include a view of a collaboration environment. In particular, the user interface 500 may comprise a work unit page 502 for a work unit record (e.g., "Project Y" as reference in the third item 310 in user interface 300 of FIG. 3). The user interface 500 may display values of one or more parameters for the work unit record, and/or other information. By way of non-limiting illustration, user interface 500 may include one or more of a user interface element 503 displaying a title of the new work unit record (Project Y), a user interface element 504 displaying a list of members of the work unit record (e.g., Dave and Tom), a user interface element 506 displaying a description of the work unit record, a user interface element 508 displaying a list of associated work unit records, a user interface element 510 displaying comments, and/or other elements.

One or more values of one or more parameters of the work unit record may reflect an outcome of manifesting a virtual agent to execute action instructions derived from a response to a prompt. In this scenario, the prompt may be automatically generated in response to a context trigger of a work unit record being marked complete (see, e.g., third item 30 in FIG. 3). The prompt may be related to, for example, sending Tom a message to let him know his work on Project Y has been reviewed by Dave. In some implementations, the message may be expressed through a comment within user interface element 510 where comments appear. The comment may be displayed as if it were written by Dave himself (e.g., identify Dave), and/or may emulate how Dave communicates (e.g., personal writing style, tone, etc.).

FIGS. 3-5 and associated descriptions are provided for illustrative purposes only and are not to be considered limiting. Instead, those skilled in the art may appreciate other configurations and/or displays within user interfaces that may be provided which reflect one or more of the features and/or functionally described herein.

Referring back to FIG. 1, in some implementations, server(s) 102, client computing platform(s) 104, and/or external resources 126 may be operatively linked via one or more electronic communication links. For example, such electronic communication links may be established, at least in part, via network(s) 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Server(s) 102 may include electronic storage 128, one or more processors 130, and/or other components. Server(s) 102 may include communication lines, or ports to enable the exchange of information with network(s) 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 111, 112, 114, and/or other components. Processor(s) 130 may be configured to execute components 108, 110, 111, 112, 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 111, 112, and/or 114 are illustrated in FIG. 1 as being implemented within a single processing unit, in implementations in which processor(s) 130 includes multiple processing units, one or more of components 108, 110, 111, 112, and/or 114 may be implemented remotely from the other components. The description of the functionality provided by the different components 108, 110, 111, 112, and/or 114 described herein is for illustrative purposes, and is not intended to be limiting, as any of components 108, 110, 111, 112, and/or 114 may provide more or less functionality than is described. For example, one or more of components 108, 110, 111, 112, and/or 114 may be eliminated, and some or all of its functionality may be provided by other ones of components 108, 110, 111, 112, and/or 114. As another example, processor(s) 130 may be configured to execute one or more additional components that may perform some or all of the functionality attributed herein to one of components 108, 110, 111, 112, and/or 114.

Figure 2A:
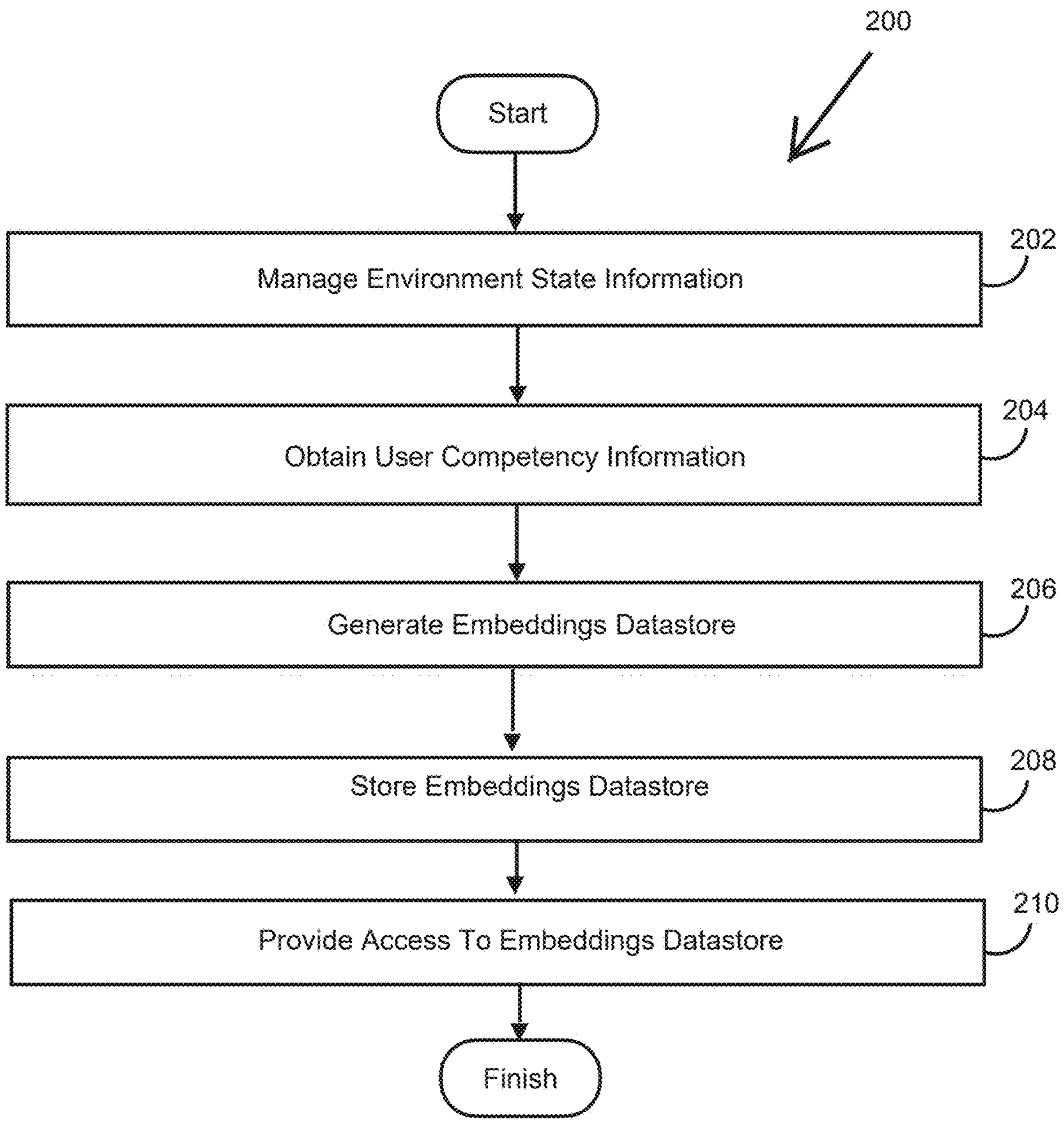
FIG. 2*a* illustrates a method to generate embeddings of user competency information derived from user interactions with a collaboration environment, in accordance with one or more implementations.

FIG. 2*a* illustrates a method 200 to generate embeddings of user competency information derived from user interactions with a collaboration environment, in accordance with one or more implementations. The operations of method 200 presented herein are intended to be illustrative. In some implementations, method 200 may be accomplished with one or more additional operations not described, and/or without one or more of the operations discussed. Additionally, the order in which the operations of method 200 are illustrated in FIG. 2 and described herein is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment and/or each other. The users may interact with the collaboration environment and/or each other through instances of a graphical user interface. The environment state information may include work unit records and/or other records. The work unit records may describe units of work managed, created, and/or assigned within the collaboration environment. Operation 202 may be performed by one or more hardware processors configured by machine-readable instructions including a component that is the same as or similar to environment state component 108 (shown in FIG. 1 and described herein), in accordance with one or more implementations.

An operation 204 may obtain user competency information and/or other information. The user competency information may characterize user competencies derived from interaction by users with the collaboration environment. The user competency information may include first user competency information for a first user. The first user competency information may characterize a first set of competencies of the first user derived from a first set of user interactions by the first user with the collaboration environment. Operation 204 may be performed by one or more hardware processors configured by machine-readable instructions including a component that is the same as or similar to user component 111 (shown in FIG. 1 and described herein), in accordance with one or more implementations.

An operation 206 may generate one or more embeddings datastores based on user competency information and/or other information. An embeddings datastore may include a vector space representation of user competency information and/or other information. A vector space representation may comprise vectors representing information units of the user competency information. By way of non-limiting illustration, an embeddings datastore may include a vector space representation of the first competency information. Operation 206 may be performed by one or more hardware processors configured by machine-readable instructions including a component that is the same as or similar to model component 112 (shown in FIG. 1 and described herein), in accordance with one or more implementations.

An operation 208 may store embeddings datastore(s) in one or more storage locations. Operation 208 may be performed by one or more hardware processors configured by machine-readable instructions including a component that is the same as or similar to model component 112 (shown in FIG. 1 and described herein), in accordance with one or more implementations.

An operation 210 may provide one or more models with access to one or more embeddings datastores. The one or more models may utilize the one or more embeddings datastores as resource(s) for the model(s). By way of non-limiting illustration, a large language model may be configured to utilize an embeddings datastore to augment one or more prompts based on vector space representation of user competency information, and/or perform other operations. Operation 210 may be performed by one or more hardware processors configured by machine-readable instructions including a component that is the same as or similar to model component 112 (shown in FIG. 1 and described herein), in accordance with one or more implementations.

Figure 2B:
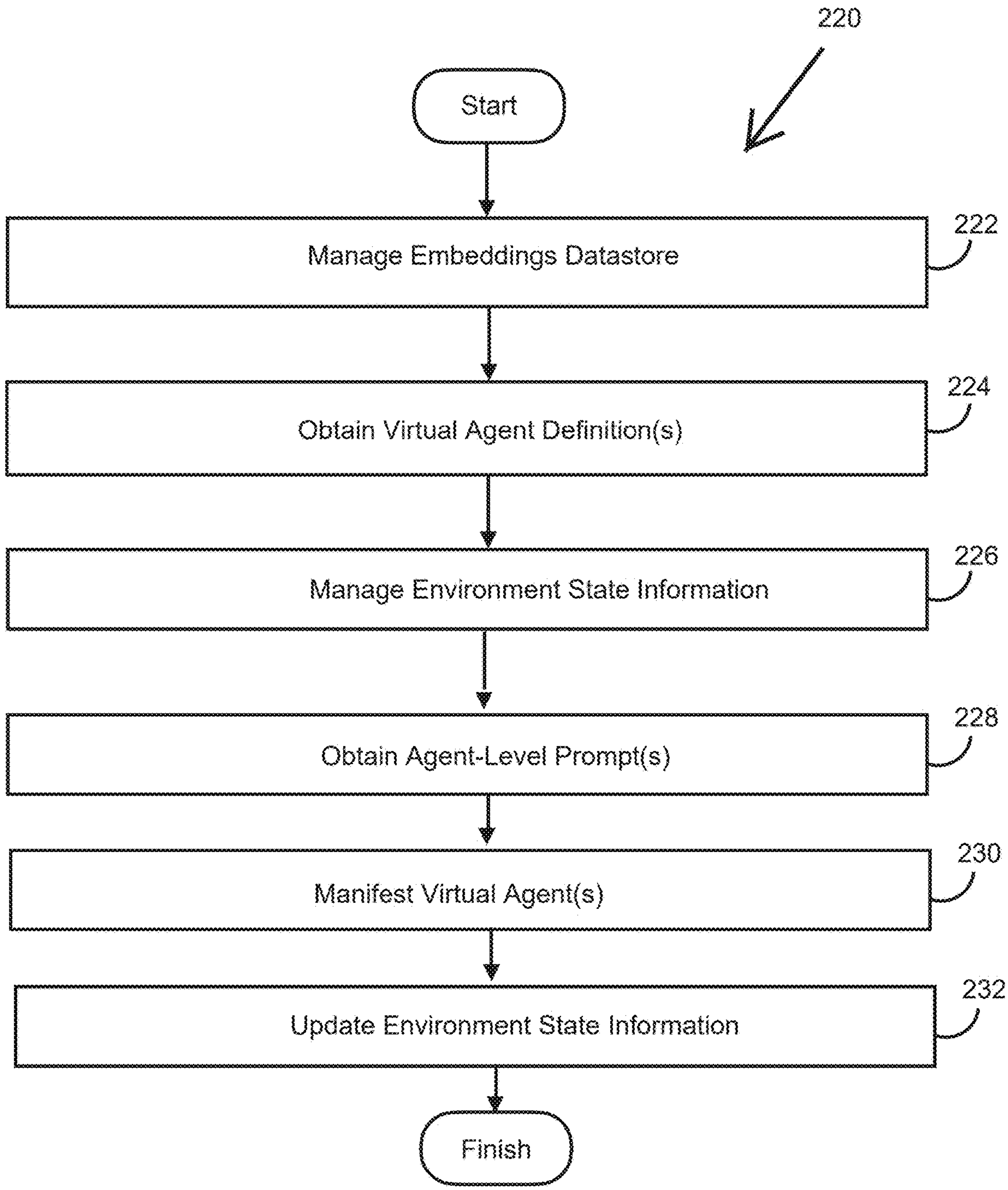
FIG. 2*b* illustrates a method to implement virtual agents representing users of a collaboration environment, in accordance with one or more implementations.

FIG. 2*b* illustrates a method 220 to implement virtual agents representing users of a collaboration environment, in accordance with one or more implementations. The operations of method 220 presented herein are intended to be illustrative. In some implementations, method 220 may be accomplished with one or more additional operations not described, and/or without one or more of the operations discussed. Additionally, the order in which the operations of method 220 are illustrated in FIG. 2*b* and described herein is not intended to be limiting.

In some implementations, method 220 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 220 in response to instructions stored electronically on an electronic storage medium. The one or more processing devices may include one or more devices configured through hardware, firmware, and/or software to be specifically designed for execution of one or more of the operations of method 220.

An operation 222 may manage one or more embeddings datastore(s). An embeddings datastore may comprise a vector space representation of user competency information and/or other information. The user competency information may characterize user competencies of individual users derived from interaction by users with a collaboration environment. The vector space representation may comprise vectors representing information units of the user competency information. Operation 222 may be performed by one or more hardware processors configured by machine-readable instructions including a component that is the same as or similar to model component 112 (shown in FIG. 1 and described herein), in accordance with one or more implementations.

An operation 224 may obtain virtual agent definitions of virtual agents representing the users. Individual virtual agents may represent individual users and/or individual groups of users. The virtual agent definitions may identify lists of resources available to the virtual agents. The virtual agent definitions may include instructions dictating how resource(s) are utilized to manifest the virtual agents. Individual virtual agents may represent individual users by virtue of having access to a virtual space representation of information units of user competency information for the individual users. By way of non-limiting illustration, the virtual agent definitions may include a first virtual agent definition of a first virtual agent representing the first user. The first virtual agent definition may include one or more of an identification of a first list of resources, first instructions which dictate how resources in the first list of resources are utilized to manifest the first virtual agent, and/or other information. Operation 224 may be performed by one or more hardware processors configured by machine-readable instructions including a component that is the same as or similar to model component 112 (shown in FIG. 1 and described herein), in accordance with one or more implementations.

An operation 226 may manage environment state information maintaining a collaboration environment. The collaboration environment may be configured to facilitate interaction by users with the collaboration environment and/or each other. The users may interact with the collaboration environment and/or each other through instances of a graphical user interface. The environment state information may include work unit records and/or other records. The work unit records may describe units of work managed, created, and/or assigned within the collaboration environment. Operation 226 may be performed by one or more hardware processors configured by machine-readable instructions including a component that is the same as or similar to environment state component 108 (shown in FIG. 1 and described herein), in accordance with one or more implementations.

An operation 228 may obtain agent-level prompts to execute actions within the collaboration environment. Individual ones of the agent-level prompts may be associated with individual ones of the virtual agents. By way of non-limiting illustration, the agent-level prompts may include a first agent-level prompt to execute a first set of actions within the collaboration environment. The first agent-level prompt may be associated with the first virtual agent. Operation 228 may be performed by one or more hardware processors configured by machine-readable instructions including a component that is the same as or similar to agent component 114 (shown in FIG. 1 and described herein), in accordance with one or more implementations.

An operation 230 may manifest the virtual agents to execute the agent-level prompts, and/or perform other actions. Manifesting individual virtual agents may include executing a series of operations. By way of non-limiting illustration, manifesting virtual agents to execute agent-level prompts may comprise one or more of querying an embeddings datastore and/or other resources for relevant information units relevant to the agent-level prompts, augmenting execution of the agent-level prompts with the relevant information units, generating responses comprising action instructions for executing the actions in the collaboration environment, executing the actions in accordance with the action instructions, and/or other operations. By way of non-limiting illustration, the first virtual agent may be manifested to execute the first agent-level prompt. The first virtual agent may be manifested to execute the first agent-level prompt by one or more of querying an embeddings datastore for a first set of relevant information units relevant to the first agent-level prompt, augmenting execution of the first agent-level prompt with the first set of relevant information units, generating first action instructions for executing the first set of actions in the collaboration environment, executing the first set of actions in accordance with the first action instructions, and/or other operations. Operation 230 may be performed by one or more hardware processors configured by machine-readable instructions including a component that is the same as or similar to agent component 114 (shown in FIG. 1 and described herein), in accordance with one or more implementations.

An operation 232 may update the environment state information in response to execution of agent-level prompts. Operation 232 may be performed by one or more hardware processors configured by machine-readable instructions including a component that is the same as or similar to environment state component 108 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to implement virtual agents representing users of a collaboration environment, the system comprising:

an embeddings datastore, the embeddings datastore comprising a vector space representation of user competency information, the user competency information characterizing user competencies of individual users derived from interaction by users with a collaboration environment, the vector space representation comprising vectors representing information units of the user competency information;

non-transitory electronic storage storing virtual agent definitions of virtual agents representing the users, the virtual agent definitions identifying lists of resources available to the virtual agents, and including instructions dictating how the resources are utilized to manifest the virtual agents, the resources including the embeddings datastore and one or more models, the virtual agent definitions including a first virtual agent definition of a first virtual agent representing a first user, the first virtual agent definition identifying a first list of resources, and including first instructions which dictate how the resources in the first list of resources are utilized to manifest the first virtual agent; and one or more physical processors configured by machine-readable instructions to:

manage environment state information maintaining the collaboration environment, the collaboration environment being configured to facilitate the interaction by the users with the collaboration environment, the users interacting with the collaboration environment through instances of a graphical user interface, the environment state information including work unit records, the work unit records describing units of work managed, created, and/or assigned within the collaboration environment;

obtain agent-level prompts to execute actions within the collaboration environment, individual ones of the agent-level prompts being associated with individual ones of the virtual agents, the agent-level prompts including a first agent-level prompt to execute a first set of actions within the collaboration environment, the first agent-level prompt being associated with the first virtual agent;

manifest the virtual agents to execute the agent-level prompts, wherein manifesting the virtual agents to execute the agent-level prompts comprises searching the embeddings datastore for relevant information units relevant to the agent-level prompts, and augmenting execution of the agent-level prompts with the relevant information units, wherein executing the agent-level prompts further comprises generating action instructions for executing the actions in the collaboration environment, and executing the actions in accordance with the action instructions, wherein the first virtual agent is manifested to execute the first agent-level prompt by:

searching the embeddings datastore for a first set of relevant information units relevant to the first agent-level prompt;

augmenting execution of the first agent-level prompt with the first set of relevant information units; and wherein executing the first agent-level prompt further comprises generating first action instructions for executing the first set of actions in the collaboration environment, and executing the first set of actions in accordance with the first action instructions; and update the environment state information in response to execution of the agent-level prompts.

2. The system of claim 1, wherein the instructions in the virtual agent definitions dictating how the resources are utilized to manifest the virtual agents include instructions to configure resource-level prompts for the resources.

3. The system of claim 2, wherein executing the first agent-level prompt further comprises:

configuring a first resource-level prompt to the one or more models to perform the searching the embeddings datastore for the first set of relevant information units relevant to the first agent-level prompt;

configuring a second resource-level prompt to the one or more models to generate a first augmented prompt based on the first set of relevant information units;

configuring a third resource-level prompt to the one or more models to generate a first response to the first augmented prompt, the first response including the first action instructions; and configuring a fourth resource-level prompt to the one or more models to execute the first set of actions within the collaboration environment in accordance with the first action instructions.

4. The system of claim 1, wherein the one or more physical processors are further configured by the machine-readable instructions to:

detect, based on monitoring the environment state information, occurrences of individual trigger events; and automatically generate the individual ones of the agent-level prompts in response to detection of the occurrence of the individual trigger events.

5. The system of claim 1, wherein the actions within the collaboration environment include one or more of changing completion status of an individual work unit record, assigning an individual user to the individual work unit record, generating one or more work unit records, organizing the one or more work unit records, generating text within a page of the graphical user interface, or executing a workflow.

6. A method to implement virtual agents representing users of a collaboration environment, the method comprising:

managing an embeddings datastore, the embeddings datastore comprising a vector space representation of user competency information, the user competency information characterizing user competencies of individual users derived from interaction by users with a collaboration environment, the vector space representation comprising vectors representing information units of the user competency information;

obtaining virtual agent definitions of virtual agents representing the users, the virtual agent definitions identifying lists of resources available to the virtual agents, and including instructions dictating how the resources are utilized to manifest the virtual agents, the resources including the embeddings datastore and one or more models, the virtual agent definitions including a first virtual agent definition of a first virtual agent representing a first user, the first virtual agent definition identifying a first list of resources, and including first instructions which dictate how the resources in the first list of resources are utilized to manifest the first virtual agent;

managing environment state information maintaining the collaboration environment, the collaboration environment being configured to facilitate the interaction by the users with the collaboration environment, the users interacting with the collaboration environment through instances of a graphical user interface, the environment state information including work unit records, the work unit records describing units of work managed, created, and/or assigned within the collaboration environment;

obtaining agent-level prompts to execute actions within the collaboration environment, individual ones of the agent-level prompts being associated with individual ones of the virtual agents, the agent-level prompts including a first agent-level prompt to execute a first set of actions within the collaboration environment, the first agent-level prompt being associated with the first virtual agent;

manifesting the virtual agents to execute the agent-level prompts, wherein manifesting the virtual agents to execute the agent-level prompts comprises searching the embeddings datastore for relevant information units relevant to the agent-level prompts, and augmenting execution of the agent-level prompts with the relevant information units, wherein executing the agent-level prompts further comprises generating action instructions for executing the actions in the collaboration environment, and executing the actions in accordance with the action instructions, wherein the first virtual agent is manifested to execute the first agent-level prompt by:

searching the embeddings datastore for a first set of relevant information units relevant to the first agent-level prompt;

augmenting execution of the first agent-level prompt with the first set of relevant information units; and wherein executing the first agent-level prompt further comprises generating first action instructions for executing the first set of actions in the collaboration environment, and executing the first set of actions in accordance with the first action instructions; and updating the environment state information in response to execution of the agent-level prompts.

7. The method of claim 6, wherein the instructions in the virtual agent definitions dictating how the resources are utilized to manifest the virtual agents include instructions to configure resource-level prompts for the resources.

8. The method of claim 7, wherein executing the first agent-level prompt further comprises:

configuring a first resource-level prompt to the one or more models to perform the searching the embeddings datastore for the first set of relevant information units relevant to the first agent-level prompt;

configuring a second resource-level prompt to the one or more models to generate a first augmented prompt based on the first set of relevant information units;

configuring a third resource-level prompt to the one or more models to generate a first response to the first augmented prompt, the first response including the first action instructions; and configuring a fourth resource-level prompt to the one or more models to execute the first set of actions within the collaboration environment in accordance with the first action instructions.

9. The method of claim 6, further comprising:

detecting, based on monitoring the environment state information, occurrences of individual trigger events; and automatically generating the individual ones of the agent-level prompts in response to detection of the occurrence of the individual trigger events.

10. The method of claim 6, wherein the actions within the collaboration environment include one or more of changing completion status of an individual work unit record, assigning an individual user to the individual work unit record, generating one or more work unit records, organizing the one or more work unit records, generating text within a page of the graphical user interface, or executing a workflow.

* * * * *